United States Patent [19]
Ekholm et al.

[11] Patent Number: 5,744,004
[45] Date of Patent: Apr. 28, 1998

[54] SYSTEM FOR FEEDING A SUSPENSION TO A PRESSURIZED VESSEL

[75] Inventors: Rolf Ekholm; Ulf Jansson, both of Karlstad, Sweden

[73] Assignee: Kvaerner Pulping AB, Sweden

[21] Appl. No.: 705,709

[22] Filed: Aug. 20, 1996

[30] Foreign Application Priority Data

Apr. 17, 1996 [SE] Sweden .................................. 9601461

[51] Int. Cl.$^6$ ..................................................... D21C 7/06
[52] U.S. Cl. ........................... 162/246; 162/237; 162/241; 162/242
[58] Field of Search .................................. 162/236, 237, 162/238, 246, 52, 241, 242; 415/90, 206

[56] References Cited

U.S. PATENT DOCUMENTS

| | | | |
|---|---|---|---|
| 3,411,986 | 11/1968 | Buchberger et al. | 162/246 |
| 4,071,399 | 1/1978 | Prough | 162/16 |
| 4,773,819 | 9/1988 | Gurth | 415/90 |
| 5,300,195 | 4/1994 | Richter et al. | 162/246 |
| 5,476,572 | 12/1995 | Prough | 162/246 |
| 5,622,598 | 4/1997 | Prough | 162/52 |

*Primary Examiner*—Donald E. Czaja
*Assistant Examiner*—Jose A. Fortuna
*Attorney, Agent, or Firm*—Fasth Law Firm

[57] ABSTRACT

System for feeding a suspension, preferably a suspension of chips in a liquid carrier, to a pressurized vessel in a cellulose pulp mill, which system comprises at least one pump (25, 26) between a low-pressure part and the pressurized vessel for driving the suspension from the low-pressure part into the vessel, which pump is of the type which comprises a number of parallel discs (40, 42) which are held together to form a stack (39) and rotate in a pump chamber (36) in a pump housing about a common axis of rotation, with the spaces (46) between the discs being greater than the particles in the suspension, and with an axial inlet and a tangential outlet for the suspension. The invention also includes a pump and an apparatus unit which are intended to form part of the system.

26 Claims, 8 Drawing Sheets

SYSTEM FOR FEEDING A SUSPENSION TO A PRESSURIZED VESSEL

TECHNICAL FIELD

The invention relates to a system for feeding a suspension, preferably a suspension of chips in a liquid carrier, to a pressurized vessel in a cellulose pulp mill. The invention relates in particular to a system for feeding a suspension of chips in a liquid carrier into a pressurized pre-impregnation vessel, or directly to and into a continuously operating digester, preferably through an inlet at the top of the pressurized digester. The system can also be used for feeding suspensions to other types of pressurized vessels in a cellulose pulp mill, for example pressurized causticizing vessels.

STATE OF THE ART

FIG. 1 illustrates a conventional system of the type mentioned in the introduction for feeding chips to a continuously operating digester. From a chip container 1, the chips are charged via a metering device 2, which in principle consists of a rotating cell wheel with a variable speed of rotation, and a low-pressure feeder 3 in the form of a star wheel feeder, to a steaming vessel 4 where the chips are degassed and pre-heated with the aid of steam which is recovered from the pulp mill. From the steaming vessel 4, the steamed chips are conveyed via a chip chute 5 to a high-pressure feeder 6. The high-pressure feeder 6, which consists of a so-called high-pressure tap, can be said to constitute the heart of the conventional feeding system as a whole. It functions in principle as a sluice between, on the one hand, the low-pressure part, which is represented by the parts just mentioned and by a downstream return loop, which comprises a line 7 with a first pump 8, a sand separator 9, a strainer 10 with a return line 11 to the chip chute 5, and a buffer tank 13, and, on the other hand, a high-pressure part which is represented by an ascending line 15 running from the high-pressure tap 6 to the inlet 16 at the top of the continuously operating digester 17, the digester 17 itself, a return line 18 for extraction liquid from the digester 17, and a second pump 19 in the return line 18. A high-pressure pump 20 feeds cooking liquid to the top of the digester and contributes to maintaining the desired pressure in the digester 17. The cooking liquid consists, on the one hand, of white liquor which is supplied via a separate line 12, and, on the other hand, of recirculated liquid from the buffer tank 13. In addition, there is a pump 21 for recirculating black liquor.

As has been mentioned, the high-pressure feeder 6 comprises a high-pressure tap which can be rotated slowly in a feeder housing and has four continuous compartments so that the feeder is filled, in a certain position of rotation, with a dose of chips from the chip chute 5, which dose, in the next position of rotation, is discharged into the ascending line 15 under the influence of the pump 19 in the high-pressure part. The high-pressure feeder 6 has certain specific advantages: it does not damage the chips, it functions as an effective barrier against back-blowing, and it is robust and, as experience has shown, very reliable. But at the same time it has a number of disadvantages: it is very complicated and therefore expensive to manufacture, it operates in a pulsatile manner, and it has to be shut down fairly often for servicing. However, its advantages have been considered so great that it has remained unchanged in principle for at least 40 years and is still universally employed as a chip feeder for continuous chip digesters. The rest of the feeding system has

2 also remained largely unchanged during this period of time. Certain variants have been proposed over the years. For example, U.S. Pat. No. 5,476,572 describes a modified system which is, however, still based on the use of the known type of high-pressure feeder.

Feeding systems have also been proposed which make use of feed-in devices other than the said high-pressure feeder with high-pressure tap. Thus, for example, U.S. Pat. No. 3,874,996 describes a system where a low-pressure pump feeds in the chips in the form of a slurry to a cylinder via a shut-off valve, after which the valve is closed and the contents of the cylinder are driven into the reactor with the aid of a high-pressure pump. Thus, this system too operates with a sluice and therefore in a pulsatile manner in accordance with the same basic principle as the conventional system, albeit with other components. As far as the Applicant is aware, the system has never been put into practical use.

BRIEF DESCRIPTION OF THE INVENTION

The object of the invention is to offer a feeding system of the type mentioned in the introduction, which system is not based on the use of a feeder operating as a sluice between the low-pressure and high-pressure parts of the system. The invention instead proposes to offer a simpler feeding system with fewer pressurized feed lines than in conventional systems, but without thereby waiving the requirement that the chips or equivalent must not be damaged by the feeding members. These and other objectives can be achieved by virtue of the fact that the feeding system comprises at least one pump between a low-pressure part and the pressurized vessel for driving the suspension from the low-pressure part into the pressurized vessel, which pump is of the type which comprises a stack, a so-called disc pack, consisting of a number of parallel discs which are held together and rotate in a pump housing about a common axis of rotation, with the spaces between the discs being greater than the particles in the suspension, and with an axial inlet and a tangential outlet for the suspension. Pumps of this type are known under the trade name DISCFLO. The basic principle of the pump type is described in EP-0,016,825, and developments of the same pump are described in U.S. Pat. Nos. 4,514,139, 4,768,920, and 4,773,819. This pump type is used to a considerable extent, but with relatively small dimensions, for pumping live fish, fresh fruit, and other easily damaged goods. However, this pump type has certain limitations. Thus, it is doubtful whether a single pump of this type can generate the substantial pressure increases which are needed for driving chips from the low-pressure part into the digester without the risk, inter alia, of the chips being damaged. Such substantial pressure increases are also likely to reduce the efficiency of the pump, particularly in the case of the flows pertaining in the present case. Moreover, given the dimensions that a single pump would require in order to be able to generate the desired pressure and flows, the regulating of this pump would be very expensive. These problems can be alleviated to a considerable extent by means of two or more pumps, hereinafter called disc pack pumps, being arranged in series, preferably via a return line between the digester, or equivalent pressurized vessels, and a connection line between the outlet line, which issues from the first one of the pumps coupled in series, and the inlet line going to a second downstream pump which constitutes the second of the said disc pack pumps, and by a stream of liquid being arranged to be introduced into the said connection line so as to be mixed with the suspension which is pumped out into the connection line by the first disc pack pump. Considerable advantages are achieved by this means, namely recovering a certain amount of the energy content in the pressurized return liquid, which entails reduced energy input for providing the desired pressure increase in the system. According to an alternative method for reducing the total energy requirement in the integrated system, a flow of return liquid is conducted from the pressurized vessel via a return line to a turbine arranged to drive the said pump, or the said first pump when two or more pumps are coupled in series, so as to rotate the said stack of discs in the pump.

One object of the invention is also to make it possible to eliminate other parts of the conventional feeder system which has been described above with reference to FIG. 1. For this purpose, one of the feeder pumps coupled in series, expediently the second disc pack pump or a downstream disc pack pump coupled in series to the latter, is arranged in such a way that it can be rotated with a variable speed of rotation for regulating the pressure in the digester.

Further characteristics and aspects of the invention are evident from the attached patent claims and from the following description of a preferred embodiment of the system.

DETAILED DESCRIPTION OF THE INVENTION

Figure 1:
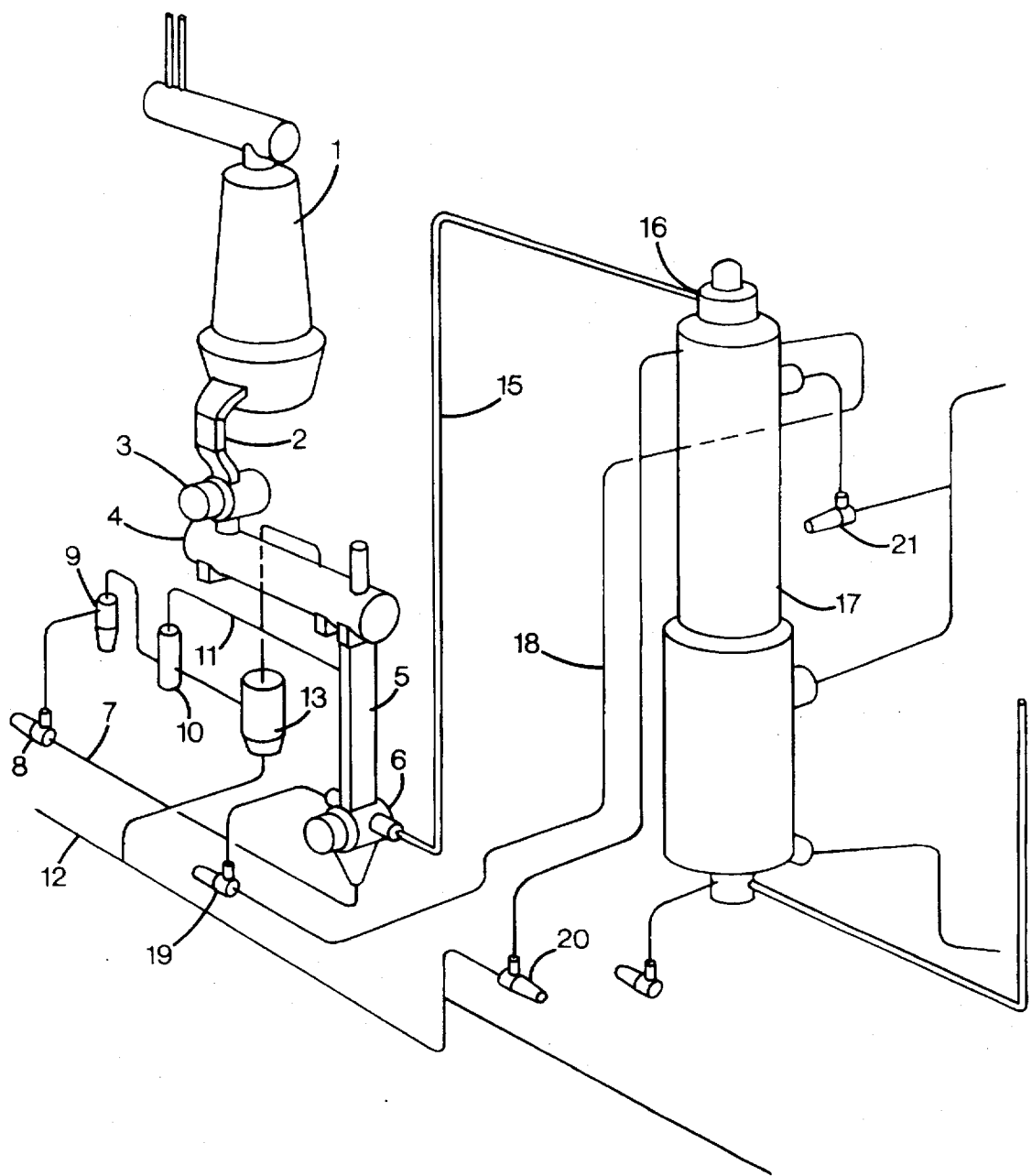
FIG. 1 shows a perspective view of the conventional feeding system which has been described above.
Figure 2:
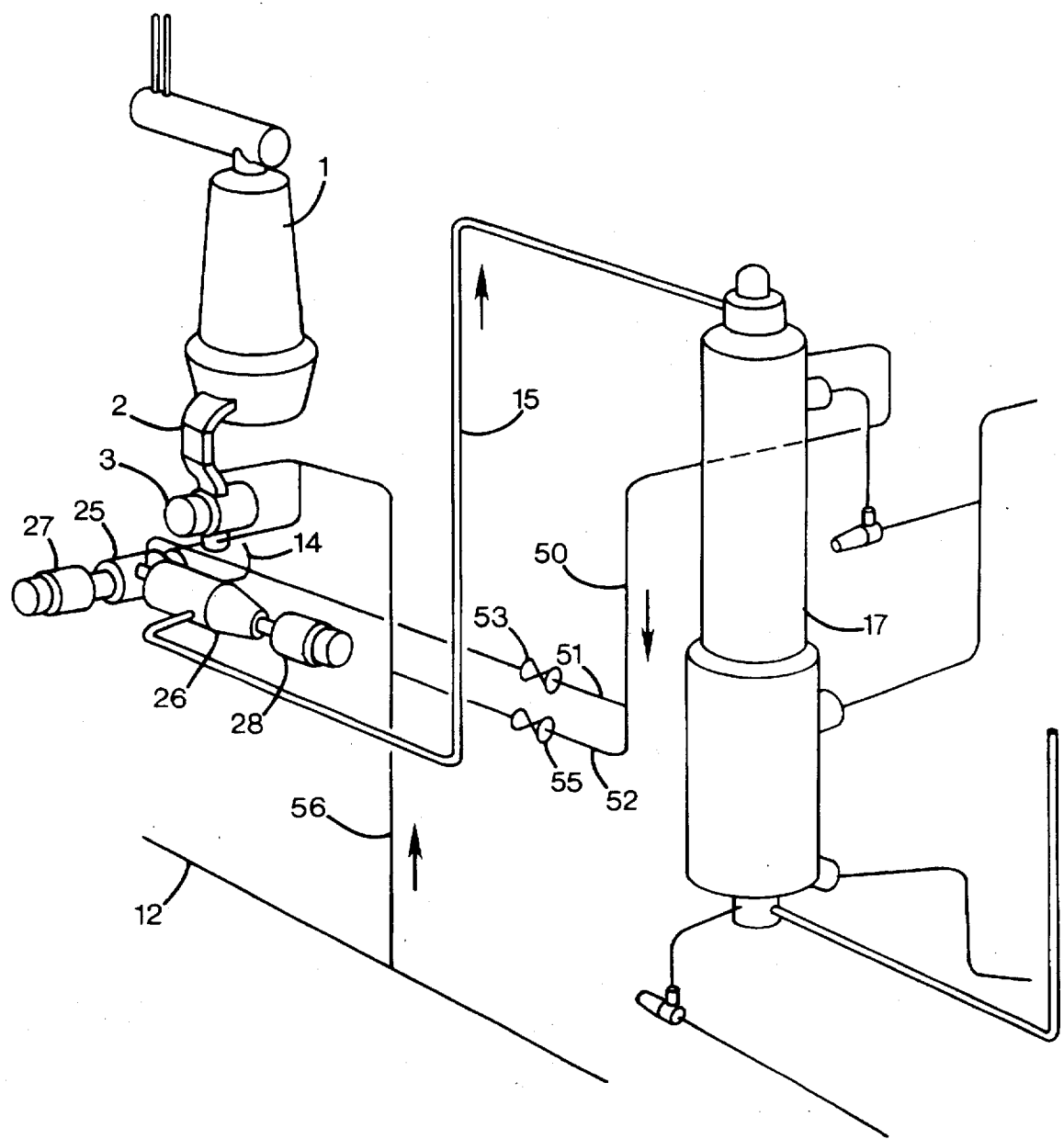
FIG. 2 shows a perspective view of a feeding system according to a first embodiment of the invention.
Figure 3:
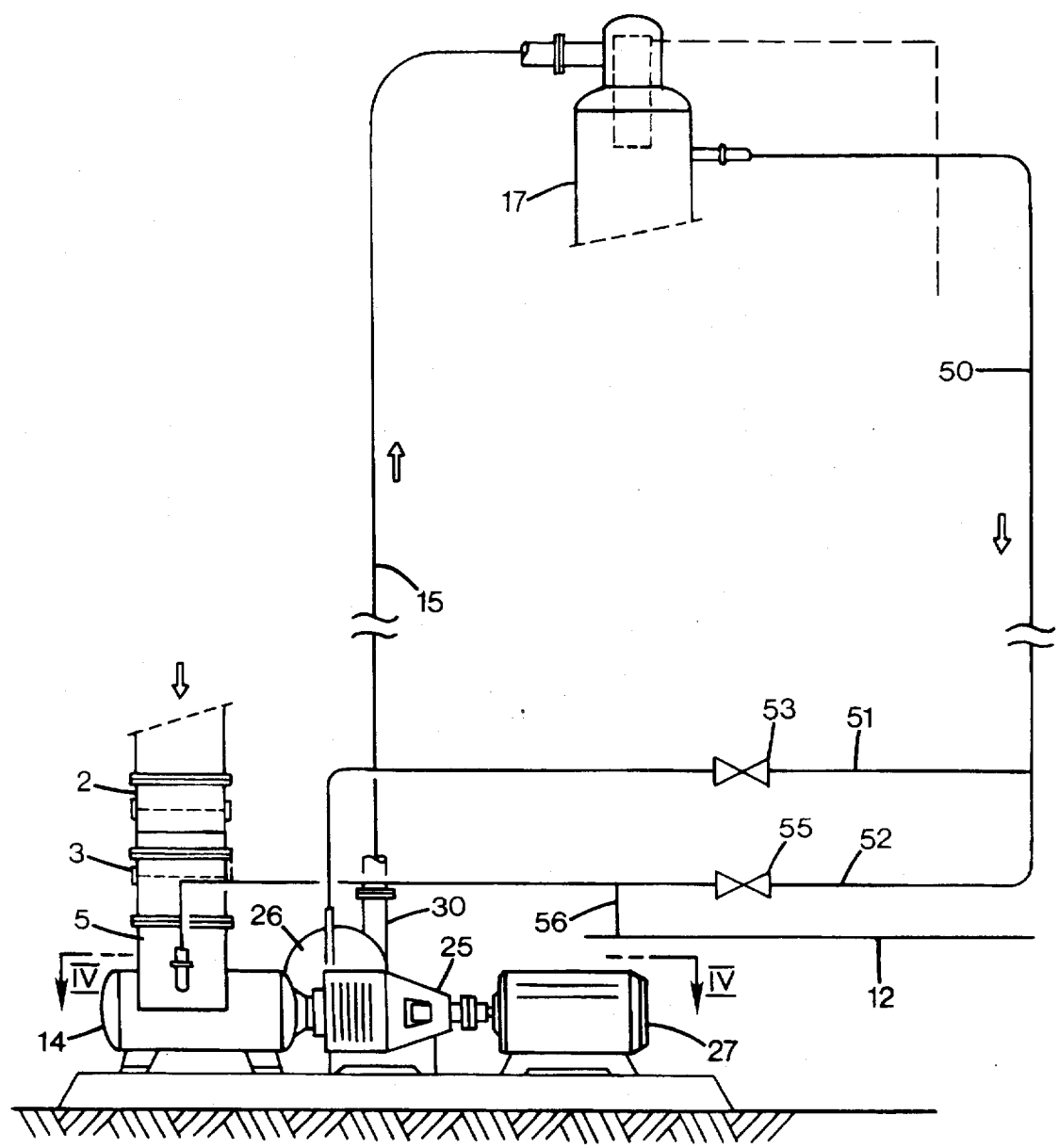
FIG. 3 shows a schematic side view of parts of the system.
Figure 4:
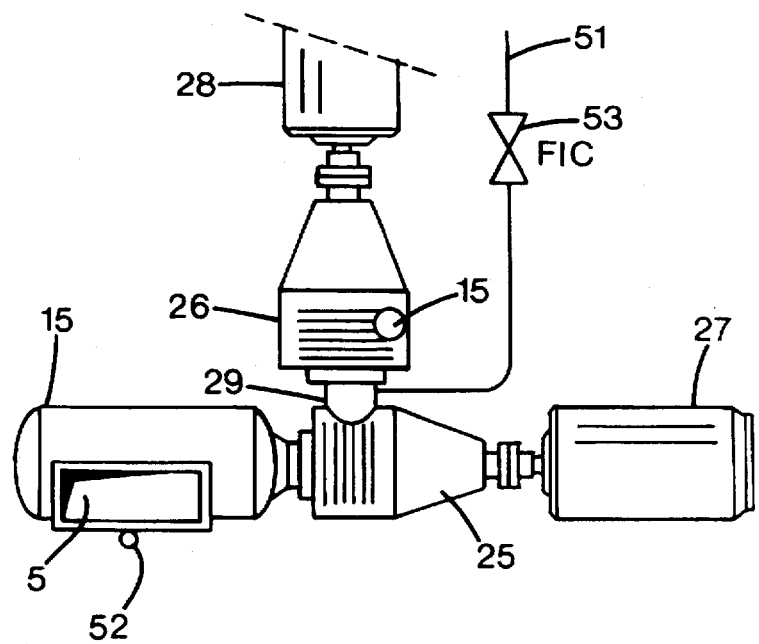
FIG. 4 shows the pump arrangement in a view IV—IV in FIG. 3.

In FIG. 2 to FIG. 4 the same reference numbers have been used as in FIG. 1 for components which have a direct equivalent in the conventional system according to FIG. 1. According to the invention, two disc pack pumps, namely a first pump 25 and a second pump 26, are coupled in series between a vortex chamber 14 and the feed line 15. According to this embodiment, the vortex chamber 14 is coupled to the axial inlet of the first pump 25 via a very short chip chute 5. The two pumps 25 and 26 are each driven by a motor 27 and 28 respectively. There is a connection line 29 between the tangential outlet of the first pump 25 and the axial inlet of the second pump 26, see FIG. 4. The feed line 15 is connected to the tangential outlet 30 of the second pump 26, see FIG. 3.

Figure 5:
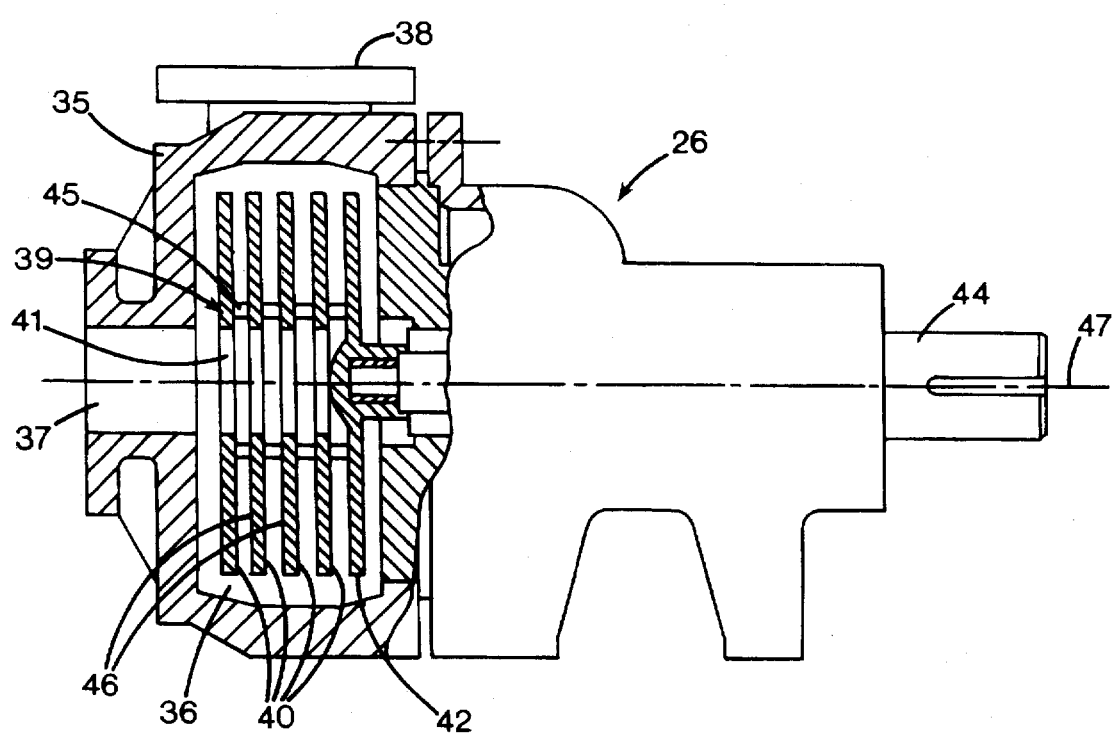
FIG. 5 shows, in schematic form, the principle of the pumps, here referred to as disc pack pumps, which are included as feeder pumps in the system.

The two pumps 25 and 26 are of the type briefly described above and here referred to as disc pack pumps. The construction principle is shown in FIG. 5, which in this case represents the first pump 25, although the second pump 26 is in principle constructed in the same way, but with other dimensions, for reasons which will be explained hereinbelow. The pump housing has generally been designated 35. A pump housing chamber 36 has an axial inlet 37 and a tangential outlet 38. In the pump housing chamber there is a so-called disc pack 39 which consists of a number of parallel annular discs 40, each having a central hole 41, and a disc 42 with a central part which is connected to a drive shaft 44 which is axially opposite the inlet opening 37. The discs are joined to one another by connection elements 45 in order to form the said integrated disc pack 39, which can be rotated as a unit about an axis of rotation 47 with the aid of the motor 27 via the drive shaft 44. Between the discs there are spaces 46 which are greater than the length of the chip particles. The size of the spaces 46, that is to say the distance between the discs, is expediently, between 20 and 200 mm. When the disc pack 39 is rotated, the discs 40, 42 draw the medium into the spaces 46 and drive this medium out through the outlet 38 without large pressure differences arising. Fresh medium, that is to say chips together with their carrier in the form of liquid, is sucked in through the inlet 37 and distributed via the central openings 41 to the spaces 46 between the discs.

According to this embodiment, the first pump 25 is arranged to increase the pressure from approximately 1.3 bar in the vortex chamber 14 to approximately 9.8 bar in the connection line 29, and the second pump 26 is arranged to further increase the pressure to a necessarily high pressure of between 13 and 17 bar in order to drive the suspension of chips and liquid up via the ascending line 15 to the inlet 16 and into the digester 17. Since this embodiment relates to an application involving a digester which is filled up with liquid, a downwardly feeding top strainer is used for separating off part of the transporting liquid from the suspension. As is known to the skilled person, the top strainer consists of a feeder screw arranged inside a strainer basket. An extraction line 50 for returned transporting liquid branches into two return lines 51 and 52. The line 51 feeds a constituent flow via a pressure-reducing valve 53 to the connection line 29 between the pumps 25 and 26. This constituent flow helps the second pump 26 to operate, as a result of which the capacity of the drive motor 28 of the second pump 26 can be substantially reduced.

The pressure in the line 51 is reduced in the pressure-reducing valve 53 so that it corresponds to the pressure in the connection line 29, for example down to 5 to 8 bar. A constituent flow corresponding to approximately 25 to 50% of the flow is fed through the return line 51 into the first pump 25. This means that the first pump 25 operates with considerably less flow than the second pump 26 and that it can be dimensioned accordingly.

A mixture of return liquid in the form of a second constituent flow from the digester 17, and white liquor from the white liquor line 12, is fed through the line 52 and the connection line 56 from the white liquor line 12 into the very short chip chute 5 upstream of the vortex chamber 14.

The second pump 26 is preferably arranged to operate with a variable speed of rotation for regulating the pressure in the digester 17.

Figure 6:
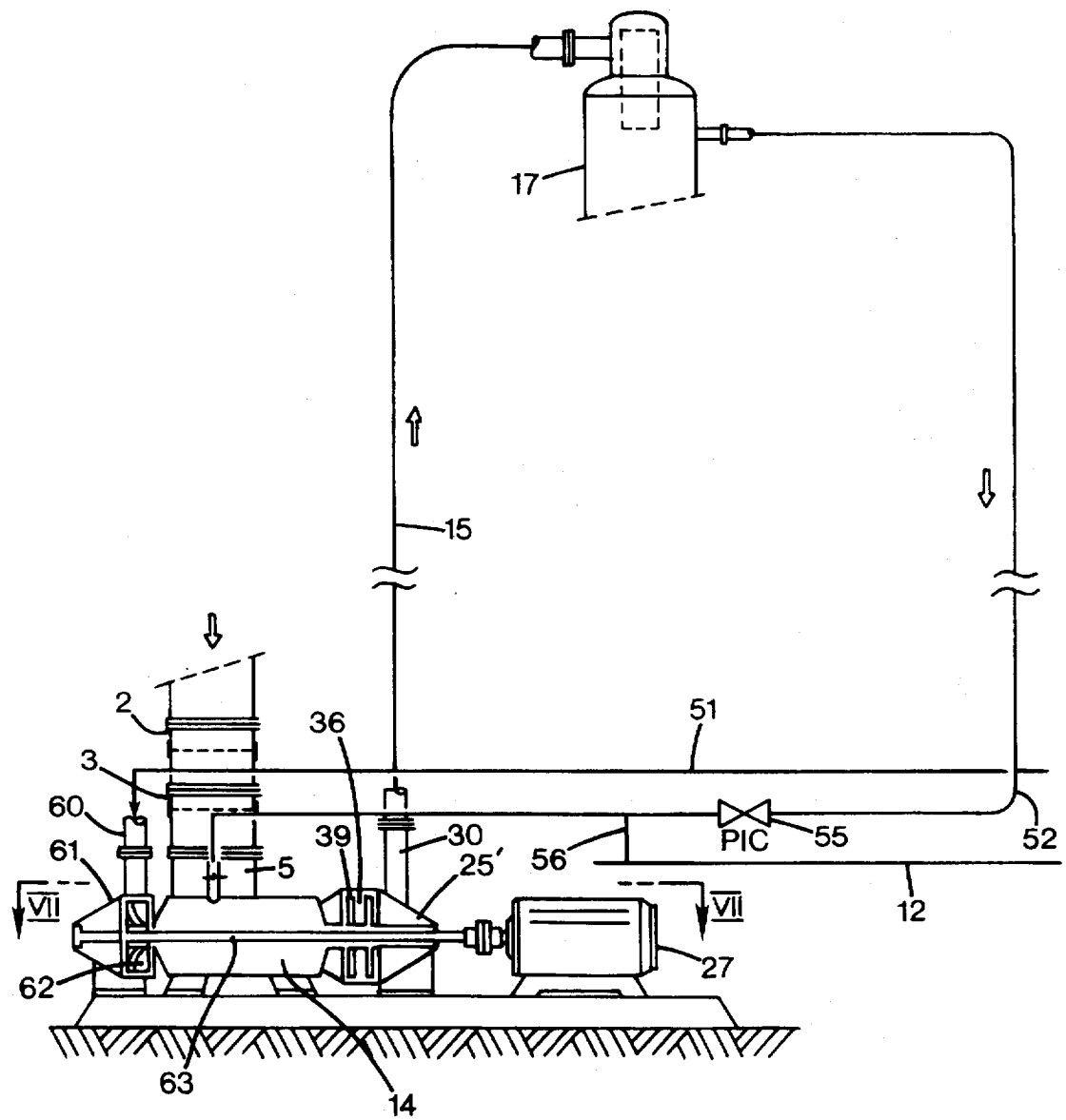
FIG. 6 is a schematic view of a further improved system according to a second, preferred embodiment of the invention.
Figure 7:
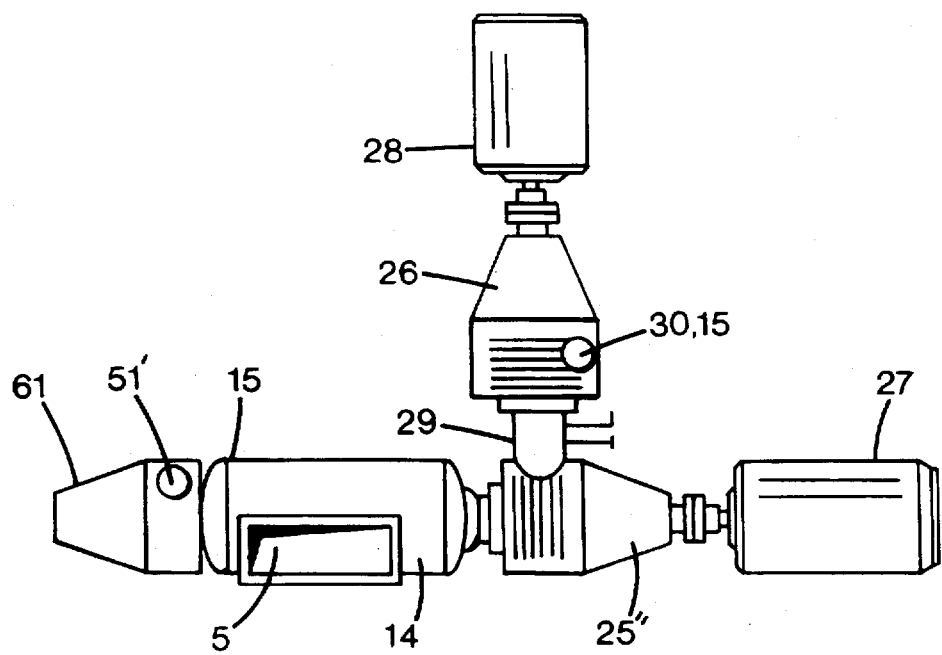
FIG. 7 shows this system in a view VII—VII in FIG. 6.

In FIGS. 6 and 7 the same reference numbers have been used for components which have a direct equivalent in the preceding figures. According to the preferred embodiment of the system which has been illustrated schematically in FIGS. 6 and 7, the constituent flow from the digester 17 through the line 51 is returned not to the connection line 29 between the first pump, which has been designated 25', and the second pump 26, but to the tangential inlet 60 of a turbine 61. The turbine can be of the Francis type with adjustable vanes for regulating the speed of rotation of the turbine, and with a blade wheel 62 and axial outlet for the liquid. In contrast to conventional Francis turbines, however, a shaft 63 connected to the blade wheel 62 extends out through the axial outlet of the turbine. The turbine 61 is moreover connected, via its axial outlet, to the inlet of the vortex chamber 14, which in turn is connected to the axial inlet of the first pump 25'. The turbine shaft 63 further extends through the vortex chamber 14 and through the inlet opening of the first pump 25' and is connected to the disc stack 39, more specifically to the disc stack 39 in the inner part of the pump housing chamber 36.

The return flow through the line 51 is arranged, preferably without pressure reduction, to drive the turbine 61, which in turn drives the first pump 25' via the shaft 63 during normal operation. However, there is a motor 26 for driving the pump 25' when necessary, such as when starting up the plant. At the outlet from the turbine 61, which is connected to the inlet of the vortex chamber 14, the desired mixing vortex for homogeneous distribution of the chips is obtained. This vortex also provides a positive contribution to the functioning of the disc pack pump 25'. From the vortex chamber 14, the rotating liquid flows into the annular clearance 37 which surrounds the shaft 63 in the area of the axial inlet of the pump 25'. By means of suitable dimensioning of the turbine 61, the latter can achieve a high degree of efficiency, as a result of which it is possible to let the first pump 25' provide most of the overall pressurizing in the two series-coupled pumps 25' and 26, despite a minimal energy input from the drive motor 27. According to this embodiment, the second disc pack pump 26 can be used in the first instance for regulating the pressure in the digester 17. The advantages of this developed system are a further improved energy recovery compared to the system according to FIGS. 2 to 4, better chip incorporation, and a desirable wood/liquid ratio for the first pump 25'. In addition, both the turbine 61 and the pump 25' can be made very robust with a dual bearing, that is to say bearing of the shaft 63 both in the turbine housing and in the pump housing.

By means of the invention, the suspension which is fed into the pressurized vessel can have a greater chip/liquid ratio than in conventional systems which operate with a high-pressure tap, that is to say can have a chip content greater than 5% by weight, preferably a chip content of 8 to 20% by weight, expediently 8 to 15% by weight. The flow can amount, for example, to 200 to 600 l/s, expediently 250 to 350 l/s.

Figure 8:
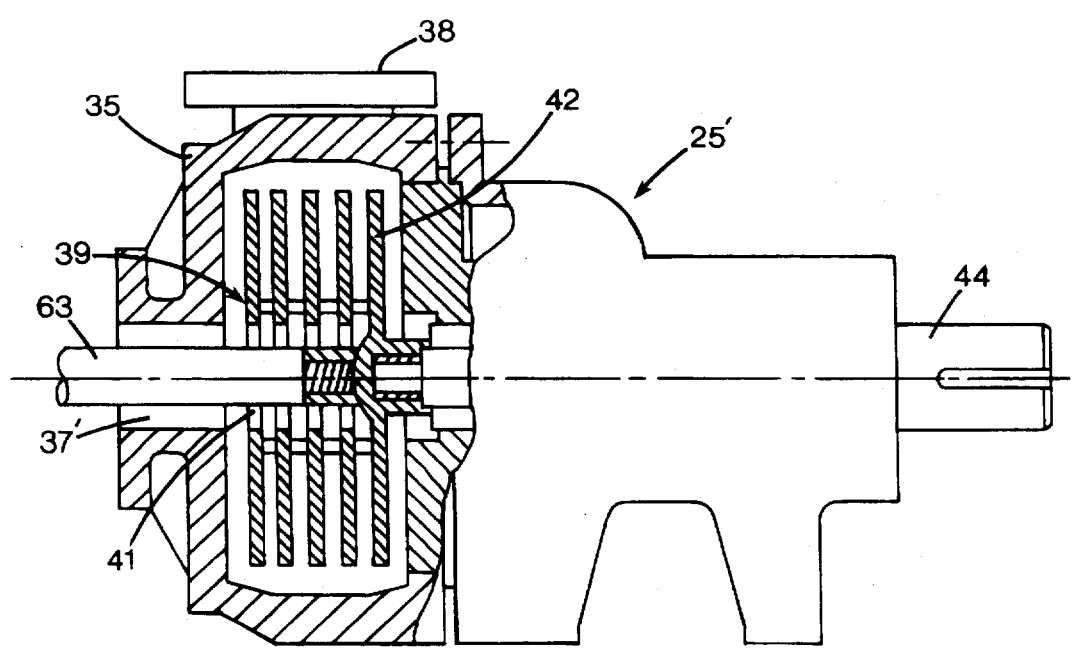
FIG. 8 shows the principle of a pump included in this improved system.

FIG. 8 illustrates a detailed cross-sectional view of the pump 25' that is shown in FIGS. 6–7. The pump 25' is very similar to the pump 26 shown in FIG. 5. The pump 25' includes a pump housing 35 that has a pump chamber 36 defined therein. An axial inlet 37' is defined at one end of the pump housing 35 so that the inlet 37' is in fluid communication with the pump chamber 36. The pump housing 35 also defines a tangential outlet 38 that is perpendicular to the inlet 37'. As mentioned above, the turbine shaft 63 is connected to the stack 39. More particularly, the shaft 63 extends through the opening 37' and is attached to the disc 42 of the stack 39. The remaining portions of the pump 25' are not described in detail because they are identical to the pump 26 illustrated in FIG. 5.

We claim:

1. A feeding system for feeding a suspension to a pressurized vessel disposed in a cellulose pulp mill, comprising:
  a pressurized vessel;
  a low-pressure portion having a flowable suspension disposed therein;
  a first pump disposed between the pressurized vessel and the low-pressure portion for driving the suspension from the low-pressure portion to the pressurized vessel, the first pump having a pump housing and defining an axial inlet for receiving the suspension and a tangential outlet for discharging the suspension;
  a pump chamber defined by the pump housing;
  a plurality of parallel discs disposed in the pump chamber, the parallel discs being held together to form a stack so that the parallel discs are rotatable about a common axis of rotation; and
  spaces defined between the parallel discs, the spaces having a size that is sufficient to permit the suspension to flow therethrough.

2. The feeding system according to claim 1 wherein a flow of return liquid from the pressurized vessel is permitted to be introduced into the low-pressure portion and a pressure-regulating device for lowering the pressure of the return liquid to a pressure level of the low-pressure portion.

3. The feeding system according to claim 1 wherein the second pump is rotatable at a variable speed for regulating a pressure in the pressurized vessel.

4. The feeding system according to claim 1 wherein a vortex chamber arrangement has an outlet opening defined therein that is in fluid communication with the inlet of the first pump.

5. The feeding system according to claim 4 wherein the vortex chamber arrangement is arranged between the turbine and the first pump, the turbine has an axial outlet opening defined therein and the shaft extends through the axial outlet opening of the turbine and through the vortex chamber arrangement into the inlet of the pump.

6. The feeding system according to claim 1 wherein a return line, for carrying a flow of return liquid, is arranged between the pressurized vessel and an inlet of a turbine for utilizing an energy content of the flow of the return liquid to drive a blade wheel mounted on a shaft disposed in the turbine, the shaft is coupled to the first pump to rotate the stack of parallel discs.

7. The feeding system according to claim 6 wherein the shaft is directly coupled to the first pump.

8. The feeding system according to claim 6 wherein the shaft of the turbine rotates the stack of the first pump and extends into the pump chamber through the inlet of the pump, the suspension is adapted to be fed into the pump through an annular clearance defined between the shaft and the inlet of the pump.

9. The feeding system according to claim 1 wherein the feeding system includes a second pump so that the first pump and the second pump are coupled in series between the pressurized vessel and the low-pressure portion.

10. The feeding systems according to claim 9 wherein the feeding systems further includes a return line disposed between the pressurized vessel and a connection line connected to the tangential outlet of the first pump so that the first pump pumps the suspension into the connection line, the connection line is connected to an inlet defined in the second pump that is downstream of the first pump so as to be mixed with the suspension that is pumped into the connection line by the first pump.

11. The feeding system according to claim 10 wherein a pressure-reducing member is disposed between the pressurized vessel and the connection line.

12. The feeding system according to claim 9 wherein the first pump pumps between 15% to 75% less flow than a flow that is pumped by the second pump.

13. The feeding system according to claim 12 wherein the first pump pumps 25% to 50% less flow than the flow pumped by the second pump.

14. The feeding system according to claim 1 wherein the pressurized vessel comprises a continuously operating digester having a top, the suspension includes chips disposed in a liquid carrier and the suspension is introduced at the top of the digester.

15. The feeding system according to claim 14 wherein the suspension has a chip content greater than five weight percent.

16. The feeding system according to claim 15 wherein the chip content is between eight and twenty weight percent.

17. The feeding system according to claim 15 wherein the chip content is between eight and fifteen weight percent.

18. The feeding system according to claim 14 wherein the suspension is fed into the pressurized vessel at a flow rate of between 200 and 600 liters per second.

19. The feeding system according to claim 18 wherein the flow rate is between 250 and 350 liters per second.

20. A feeding system for feeding a suspension, comprising:

a pressurized vessel disposed in a cellulose pump mill;

a pump for pumping a suspension having particles of a first size to the pressurized vessel, the pump having a pump housing defining a pump chamber;

a plurality of parallel discs disposed in the pump chamber, the parallel discs being held together to form a stack and rotatable about a common axis;

spaces defined between the parallel discs, the spaces being greater than the first size of the particles of the suspension;

the pump defining an axial inlet and a tangential outlet;

a drive shaft in operative engagement with the stack, the drive shaft extending through the axial inlet into the pump chamber; and an annular clearance defined between the drive shaft and the axial inlet, wherein the suspension is fed into the pump chamber through the annular clearance.

21. The feeding system according to claim 20 wherein the feeding system further includes a vortex chamber arrangement having an axial outlet opening defined therein that is in fluid communication with the axial inlet of the pump.

22. The feeding system according to claim 21 wherein the feeding system further includes a turbine having an axial outlet defined therein, the turbine includes a blade wheel that extends from the blade wheel through the axial outlet of the turbine and through the inlet of the pump to the stack disposed in the pump chamber.

23. The feeding system according to claim 22 wherein the vortex chamber arrangement is disposed between the turbine and the pump and the shaft extends through the vortex chamber arrangement.

24. A feeding system for feeding a suspension to a pressurized vessel disposed in a cellulose pulp mill, comprising:

a pressurized vessel having a suspension disposed therein, the pressurized vessel comprising a continuously operating digester having a top, the suspension including chips disposed in a liquid carrier and the suspension being introduced at the top of the digester, the suspension having a chip content between eight percent and fifteen percent;

a low-pressure portion in operative engagement with the pressurized vessel;

a first pump disposed between the pressurized vessel and the low-pressure portion for driving the suspension from the low-pressure portion to the pressurized vessel, the first pump having a pump housing and defining an axial inlet for receiving the suspension and a tangential outlet for discharging the suspension;

a second pump coupled in series with the first pump disposed between the pressurized vessel and the low-pressure portion;

a pump chamber defined by the pumping housing of the first pump, the first pump pumping between 25% to 50% less flow than a flow that is pumped by the second pump, the second pump being rotatable at a variable speed for regulating a pressure in the pressurized vessel;

a plurality of parallel discs disposed in the pump chamber, the parallel discs being held together to form a stack so that the parallel discs are rotatable about a common axis of rotation; and spaces defined between the parallel discs, the spaces being greater than the first size of the particles of the suspension;

a return line disposed between the pressurized vessel and a connection line connected to the tangential outlet of the first pump to permit the first pump to pump the suspension into the connection line, the connection line being connected to an inlet defined in the second pump that is downstream of the first pump so as to be mixed with the suspension that is pumped into the connection line by the first pump;

a pressure-reducing member disposed between the pressurized vessel and the connection line;

a return line for carrying a flow of return liquid, the return line being arranged between the pressurized vessel and the connection line;

a vortex chamber arrangement having an outlet opening defined therein that is in fluid communication with the inlet of the first pump; and a pressure-regulating device for lowering a pressure of the return liquid to a pressure level of the low-pressure portion.

25. A feeding system for feeding a suspension to a pressurized vessel disposed in a cellulose pulp mill, comprising:

a pressurized vessel having a suspension disposed therein;

a low-pressure portion in operative engagement with the pressurized vessel;

a first pump disposed between the pressurized vessel and the low-pressure portion for driving the suspension from the low-pressure portion to the pressurized vessel, the first pump having a pumping housing and defining an axial inlet for receiving the suspension and a tangential outlet for discharging the suspension;

a motor in operative engagement with the first pump via an elongate driving member, the first pump being drivable by the elongate driving member; and a vortex housing having a vortex chamber defined therein, the vortex housing being in operative engagement with the first pump and to an inlet defined by the vortex housing to permit the constituent flow to flow into the vortex chamber.

26. A feeding system according to claim 25 wherein the first pump has a pump chamber defined therein and a plurality of parallel discs are disposed in the pump chamber, the parallel discs are held together to form a stack so that the parallel discs are rotatable about a common axis of rotation and spaces are defined between the parallel discs, the spaces are greater than the first size of the particles of the suspension.

* * * * *